(12) United States Patent
Kang (10) Patent No.: US 11,182,289 B1
(45) Date of Patent: Nov. 23, 2021

(54) MEMORY SYSTEM AND OPERATING METHOD THEREOF

(71) Applicant: SK hynix Inc., Icheon-si (KR)

(72) Inventor: Hye Mi Kang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/015,306

(22) Filed: Oct. 13, 2020

(30) Foreign Application Priority Data

Jun. 16, 2020 (KR) .......................... 10-2020-0073022

(51) Int. Cl.
*G06F 12/00* (2006.01)
*G06F 12/02* (2006.01)
*G06F 12/0873* (2016.01)
*G06F 12/0811* (2016.01)
*G06F 12/0804* (2016.01)

(52) U.S. Cl.
CPC ...... *G06F 12/0246* (2013.01); *G06F 12/0804* (2013.01); *G06F 12/0811* (2013.01); *G06F 12/0873* (2013.01); *G06F 2212/7201* (2013.01); *G06F 2212/7211* (2013.01)

(58) Field of Classification Search
CPC ............. G06F 12/0246; G06F 12/0804; G06F 12/0811; G06F 12/0873; G06F 2212/7201; G06F 2212/7211
See application file for complete search history.

(56) References Cited

U.S. PATENT DOCUMENTS

| | | | |
|---|---|---|---|
| 9,696,938 B2* | 7/2017 | Gong | G06F 3/0647 |
| 2008/0229003 A1* | 9/2008 | Mizushima | G06F 12/0804 |
| | | | 711/103 |
| 2014/0215129 A1* | 7/2014 | Kuzmin | G06F 12/0246 |
| | | | 711/103 |
| 2019/0310934 A1 | 10/2019 | Danilak et al. | |
| 2020/0081647 A1* | 3/2020 | Kim | G06F 12/10 |

* cited by examiner

*Primary Examiner* — Prasith Thammavong
(74) *Attorney, Agent, or Firm* — Perkins Coie LLP (57) ABSTRACT

A memory system is provided to include memory devices and a controller including cores controlling the memory devices, respectively. The controller determines whether to perform a global wear-leveling operation based on a write count of the plurality of memory devices corresponding to each of the plurality of cores, performs a barrier operation for a request from a host when the global wear-leveling operation is determined to be performed, updates mapping information for mapping a core to memory device information by swapping the mapping information between different cores based on the write count of each of the plurality of cores and closes an open block assigned to each of the plurality of cores and then assigning a new open block to each of the plurality of cores based on the updated mapping information.

20 Claims, 8 Drawing Sheets

| LBA | CORE |
|---|---|
| LBA%2=0 | 1 |
| LBA%2=1 | 2 |

Logical address-core mapping table

| LBA | CORE |
|---|---|
| LBA%2=0 | 1 |
| LBA%2=1 | 2 |

Logical address-core mapping table

FIG. 5

| CORE | Memory Info. |
|---|---|
| 1 | MD1 |
| 2 | MD2 |

→ SWAP

Core-memory device information mapping table

FIG. 6

CORE1_MAPPING TABLE

| SEGMENT | INDEX | CLBAk | PBAk | MDk |
|---|---|---|---|---|
| L2P S1 | 1 | CLBA0 | PBA1 | MD1 |
| | 2 | CLBA1 | PBA2 | MD2 |
| | . . | . . | . . | . . |

First logical-physical address (L2P) mapping table

CORE2_MAPPING TABLE

| SEGMENT | INDEX | CLBAk | PBAk | MDk |
|---|---|---|---|---|
| L2P S1 | 1 | CLBA0 | PBA1 | MD2 |
| | 2 | CLBA1 | PBA2 | MD1 |
| | . . | . . | . . | . . |

Second logical-physical address (L2P) mapping table

MEMORY SYSTEM AND OPERATING METHOD THEREOF

CROSS-REFERENCE TO RELATED APPLICATION

This application claims the priority and benefits of Korean Patent Application No. 10-2020-0073022 filed on Jun. 16, 2020, which is incorporated herein by reference in its entirety.

TECHNICAL FIELD

The embodiments of the disclosed technology relate to a memory system. Particularly, the embodiments relate to a memory system based on a non-volatile memory, and a method for operating the memory system.

BACKGROUND

The computer environment paradigm has shifted to ubiquitous computing, in which computing is made to be used anytime and anywhere, rather than just on a desktop computer. The recent increase in the use of ubiquitous computing is leading to an increase in the use of portable electronic devices such as mobile phones, digital cameras, and notebook/laptop computers. In general, such portable electronic devices use a memory system which includes a semiconductor memory device as its data storage device. The data storage device is used as a main memory device or an auxiliary memory device of the portable electronic devices.

Such a semiconductor memory device provides advantages over the traditional hard disk drives since there is no mechanical moving part in the semiconductor memory device, and thus the memory system offers excellent stability and durability, high data rate, and low power consumption. Data storage devices having such advantages include a universal serial bus (USB) memory device, memory cards having various interfaces, and a solid state drive (SSD).

SUMMARY

The embodiments of the disclosed technology relate to a memory controller and a memory system that can perform wear leveling operations for distributing wear-out across memory devices in a memory system.

In an embodiment of the disclosed technology, a memory system comprising a plurality of memory devices, and a controller comprising a plurality of cores coupled to be in communications with, and structured to be operable to control, the plurality of memory devices, wherein each core is operable to control one or more of the plurality of memory devices, wherein the controller comprises a host interface to provide, in response to a request from a host, to one or more of the plurality of cores, memory device information corresponding to the one or more of the plurality of memory devices assigned to the one or more of the plurality of cores based on first mapping information for mapping logical addresses to the one or more of the plurality of cores and second mapping information for mapping the one or more of the plurality of cores to the memory device information, and determine whether to perform a global wear-leveling operation based on a write count of the one or more of the plurality of memory devices, and a block manager to update the second mapping information by swapping the second mapping information between different cores based on the global wear-leveling operation and transmit open block information of the memory device to each of the plurality of cores by assigning the open block information based on memory device information assigned to each of the plurality of cores.

In another embodiment of the disclosed technology, a method of operating a memory system that includes a plurality of memory devices and a controller including a plurality of cores controlling the plurality of memory devices, the method comprising determining whether to perform a global wear-leveling operation based on a write count of the plurality of memory devices corresponding to each of the plurality of cores, performing a barrier operation for a request from a host when the global wear-leveling operation is determined to be performed, updating mapping information for mapping a core to memory device information by swapping the mapping information between different cores based on the write count of each of the plurality of cores, and closing an open block assigned to each of the plurality of cores and then assigning a new open block to each of the plurality of cores based on the updated mapping information.

In another embodiment of the disclosed technology, a memory system comprising a plurality of memory devices, and a controller comprising a plurality of cores controlling the plurality of memory devices, respectively, based on the plurality of memory devices, wherein the controller comprises a host interface (I/F) suitable for providing memory device information to any one of the plurality of cores by assigning the memory device information in response to request from a host based on mapping information between a logical address and a core and mapping information between the core and the memory device information and determining whether to perform a global wear-leveling operation based on a write count, and a block manager suitable for changing the mapping information between the core and the memory device information by swapping pieces of the mapping information based on the global wear-leveling operation and transmitting open block information of the memory device to each of the plurality of cores by assigning the open block information based on memory device information assigned to each of the plurality of cores.

In another embodiment of the disclosed technology, an operating method of a memory system comprising a plurality of memory devices and a controller including a plurality of cores controlling the plurality of memory devices, respectively, based on the plurality of memory devices, the operating method comprising determining whether to perform a global wear-leveling operation based on a write count corresponding to each of the plurality of cores, performing a barrier operation for a request from a host when the global wear-leveling operation is determined to be performed, changing mapping information between a core and memory device information by swapping pieces of the mapping information based on the write count of each of the plurality of cores, and closing an open block assigned to each of the plurality of cores and then assigning a new open block each of the plurality of cores based on the changed mapping information between the core and the memory device information.

DETAILED DESCRIPTION

The technology disclosed in this patent document can be implemented in some embodiments to provide memory systems and methods that, among other features and benefits, can perform wear leveling operations by distributing wear-out across all the memory cells from different memory chips.

Figure 1:
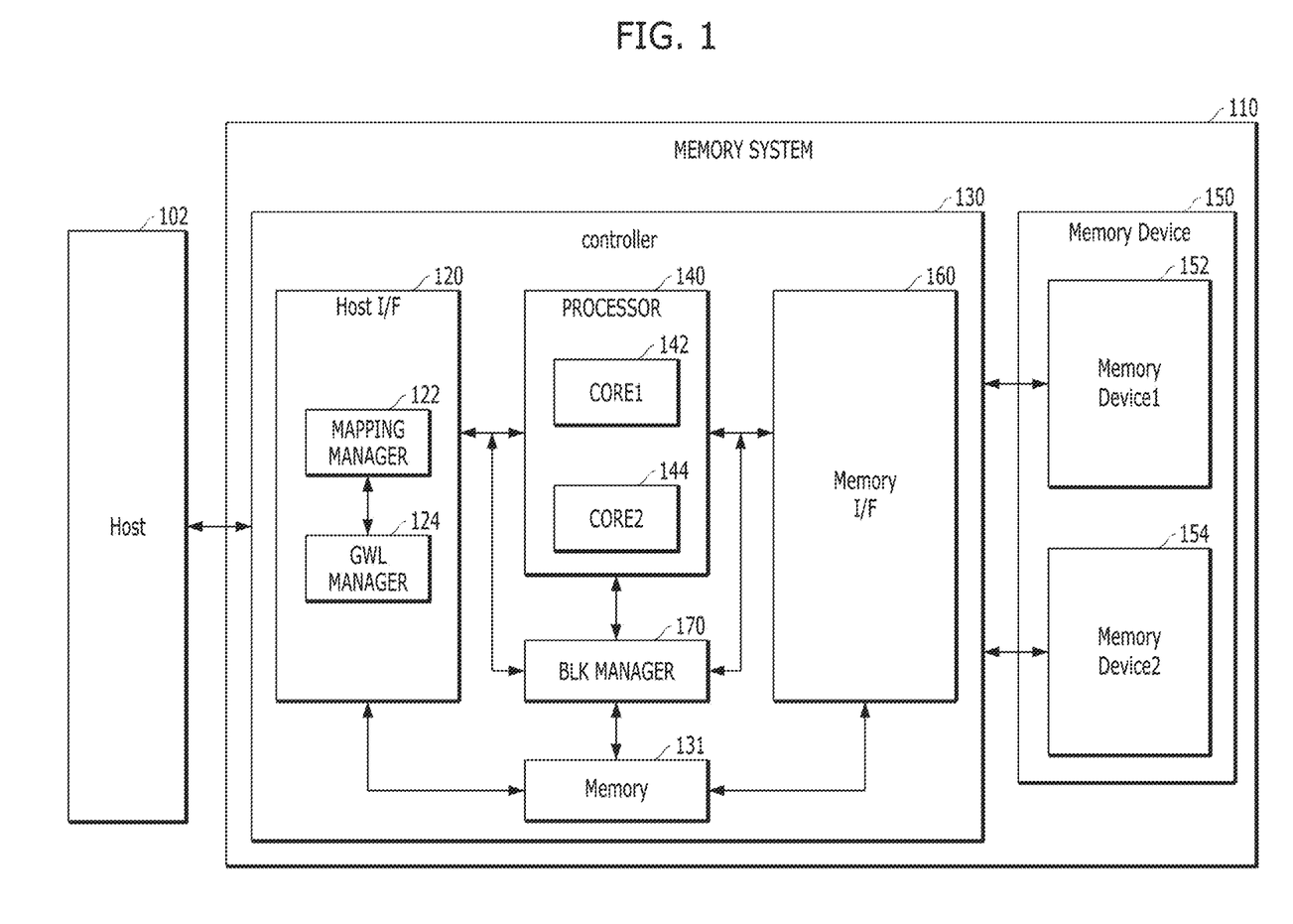
FIG. 1 is a diagram illustrating an example of a data processing system 100 including a memory system 110 based on an embodiment of the disclosed technology.

FIG. 1 is a diagram illustrating an example of a data processing system 100 including a memory system 110 based on an embodiment of the disclosed technology.

In some implementations, the data processing system 100 includes a host 102 and the memory system 110.

Examples of the host 102 may include electronic devices such as portable electronic devices, mobile phones, MP3 players and laptop computers, desktop computers, video game consoles, TVs and projectors.

The host 102 may include at least one operating system (OS). The OS generally manages the hardware and software resources of the host 102, and allows a user of the data processing system 100 to interact with the host 102. The OS includes software that supports basic functions of the host 102. The OS may include a general purpose operating system for general purpose computers and a mobile operating system that allows smartphones and tablet PCs to run applications and programs.

The memory system 110 may operate to store data in response to a request from the host 102. For example, the memory system 110 may be implemented as a data storage device, such as a multi-media card (MMC) in the form of a solid state drive (SSD), MMC, embedded MMC (eMMC), reduced size MMC (RS-MMC) or micro-MMC, a secure digital (SD) card in the form of an SD, mini-SD or micro-SD, a universal serial bus (USB) storage device, a universal flash storage (UFS) device, a compact flash (CF) card, a smart media card, and a memory stick.

In some implementations, the data storage device may include volatile memory devices, such as a dynamic random access memory (DRAM) and a static RAM (SRAM), and nonvolatile memory devices, such as a read only memory (ROM), a mask ROM (MROM), a programmable ROM (PROM), an erasable PROM (EPROM), an electrically erasable PROM (EEPROM), a ferromagnetic ROM (FROM), a phase change RAM (PRAM), a magnetic RAM (MRAM), a resistive RAM (RRAM), and a flash memory. The flash memory may have a three-dimensional stack structure.

The memory system 110 may include a plurality of memory devices 152 and 154 and a controller 130 for controlling the plurality of memory devices. In some implementations, the controller 130 includes a multi-core processor 140 with a plurality of cores 142 and 144. The plurality of memory devices 152 and 154 may store data for the host 102. The plurality of cores 142 and 144 may be used to execute instructions for controlling operations associated with the plurality of memory devices 152 and 154.

Each of the plurality of memory devices 152 and 154 may be a nonvolatile memory device that can retain its contents even in absence of power supply. The host 102 can store its data in the plurality of memory devices 152 and 154 by writing the data to the memory devices 152 and 154 through a program operation and read out the data through a read operation. Each of the plurality of memory devices 152 and 154 may include a plurality of memory blocks. Each of the memory blocks may include a plurality of pages. Each of the pages may include a plurality of memory cells coupled to a word line. In an embodiment, each of the plurality of memory devices 152 and 154 may be a flash memory. The flash memory may have a three-dimensional stack structure. The first memory device 152 of the plurality of memory devices is described as an example with reference to FIG. 2.

The controller 130 may include a host interface (I/F) 120, a processor (e.g., a multi-core processor) 140, a block (BLK) manager 170 and a memory I/F 160.

The host I/F 120 enables the host 102 to communicate with the controller 130 so that they can exchange commands, data, and logical addresses transmitted by the host 102. The host I/F 120 may provide a request from the host 102 to the processor 140 by mapping a logical address received to one of the plurality of cores 142 and 144 of the processor 140 and by mapping the one of the plurality of cores 142 and 144 to a memory device. That is, the host I/F 120 can facilitate a parallel processing of the plurality of cores 142 and 144 by distributing a request from the host 102 among the plurality of cores 142 and 144. The request may include a logical address (LBA) which will be mapped to a physical address.

The processor (e.g., multi-core processor) 140 may include the plurality of cores 142 and 144. By way of example, FIG. 1 illustrates the plurality of cores 142 and 144 as including the first core 142 and the second core 144. The plurality of cores 142 and 144 may be in communication with the plurality of memory devices 152 and 154 such that each core unit of the processor is assigned to one or more memory devices and controls operations of the corresponding one or more memory devices. The plurality of cores 142 and 144 may operate in parallel. Upon receiving a request, including a logical address and memory device information assigned by the host I/F 120, each of the plurality of cores 142 and 144 may be assigned with one or more open blocks by the block manager 146. In some implementations, the memory device information may include mapping information between the plurality of cores and the one or more open blocks, and may process the request.

In some implementations, the plurality of cores 142 and 144 and the plurality of memory devices 152 and 154 may be integrated into a single semiconductor device. For example, the plurality of cores 142 and 144 and the plurality of memory devices 152 and 154 may be integrated into a memory system such as a solid state drive (SSD), which can deliver fast and reliable read and write speeds. Furthermore, the plurality of cores 142 and 144 and the plurality of memory devices 152 and 154 may be integrated into a memory card, such as a PC card (e.g., a personal computer memory card international association (PCMCIA)), a compact flash card (CF), a smart media card (e.g., SM or SMC), a memory stick, a multimedia card (e.g., MMC, RS-MMC or MMCmicro), an SD card (e.g., SD, miniSD, microSD or SDHC), or a universal flash storage (UFS).

The plurality of cores 142 and 144 may perform a foreground operation in response to a request from the host 102. For example, the first core 142 may control the first memory device 152 to program data in a memory block of the first memory device 152 in response to a write request from the host 102, and may control the first memory device 152 to read data from a memory block of the first memory device 152 in response to a read request from the host 102. The second core 144 may control the second memory device 154 to program data in a memory block of the second memory device 154 in response to a write request from the host 102, and may control the second memory device 154 to read data from a memory block of the second memory device 154 in response to a read request from the host 102.

Furthermore, the plurality of cores 142 and 144 may perform a background operation on the plurality of memory devices 152 and 154.

The block manager 170 may manage open block information to indicate which block is available for program operations, and the open block information may be stored in the plurality of memory devices controlled by the plurality of cores 142 and 144. That is, the block manager 170 may distribute open blocks among the plurality of cores 142 and 144 so that the plurality of cores can process in parallel write requests received from the host 102. Furthermore, the block manager 170 may also manage information on the number of valid pages of the plurality of memory blocks included in the plurality of memory devices.

A memory 131 may function as a working memory of the memory system 110, and may store data for operating the memory system 110. The plurality of cores 142 and 144 may control the plurality of memory devices 152 and 154 so that the plurality of memory devices 152 and 154 can perform read, program or erase operations in response to requests from the host 102. The plurality of cores 142 and 144 may provide, to the host 102, data read from the plurality of memory devices 152 and 154, and may store, in the plurality of memory devices 152 and 154, data provided by the host 102. The memory 131 may store data that is necessary for the plurality of cores 142 and 144 and the plurality of memory devices 152 and 154 to perform such operations.

The memory 131 may be implemented as a volatile memory. For example, the memory 131 may be implemented as a static random access memory (SRAM) or a dynamic RAM (DRAM). The memory 131 may be positioned inside or outside the controller 130. FIG. 1 illustrates a case where the memory 131 is positioned within the controller 130.

When receiving a physical address based on a request from the plurality of cores 142 and 144, the memory I/F 160 may process the request for a memory device corresponding to the physical address. Furthermore, the memory I/F 160 may be used as a memory/data storage interface for facilitating communications between the controller 130 and the memory device 150, enabling the controller 130 to control the memory device 150 in response to a request from the host 102. In some implementations where the plurality of memory devices 152 and 154 are flash memories such as NAND flash memories, the memory I/F 160 may generate control signals for the memory devices 152 and 154 and process data, and thus the memory I/F 160 may be used as a NAND flash controller (NFC) that is operated under the control of the cores 142 and 144. Furthermore, the memory I/F 160 may support communications between the controller 130 and the memory device 150. For example, the memory I/F 160 may be used as a NAND flash interface for data input and output between the controller 130 and the memory devices 152 and 154. The memory I/F 160 may be operated through a flash interface layer (FIL) to exchange data with the memory devices 152 and 154.

The lifespan of memory blocks included in the plurality of memory devices 152 and 154 may be limited by the number of erase/write operations. Accordingly, if a predetermined number of erase/write operations are performed on a memory block, the memory block may be determined to be worn out. Each of the cores 142 and 144 may perform, as a background operation, a local wear-leveling operation on each of the memory device 152 and 154 controlled by the cores 142 and 144, respectively. For example, each of the cores may distribute write/erase cycles evenly among all the memory blocks within each of the memory devices by storing frequently accessed data in a memory block with a low wear level The number of requests distributed to each core may be different depending on the logical addresses in the requests received from the host 102. If requests are unevenly distributed among a plurality of cores, write/erase cycles will be unevenly distributed among memory blocks. However, such a local wear-leveling operation may not be sufficient, especially when wear-leveling operations are performed separately for a plurality of memory chips. Even with this local wear-leveling operation, a given chip can have all its memory blocks worn out while another one can have all the memory blocks still active.

In an embodiment of the disclosed technology, the controller 130 may update mapping information that is used to map the plurality of cores 142 and 144 to the plurality of memory devices 152 and 154 based on a difference in the wear-levels between the plurality of memory devices 152 and 154 based on write counts of the write operations performed by the plurality of cores 142 and 144, respectively, and may perform a global wear-leveling operation so that an operation is performed in response to a request from the host 102 based on the updated mapping, as will be discussed with reference to FIGS. 3 to 6.

Figure 2:
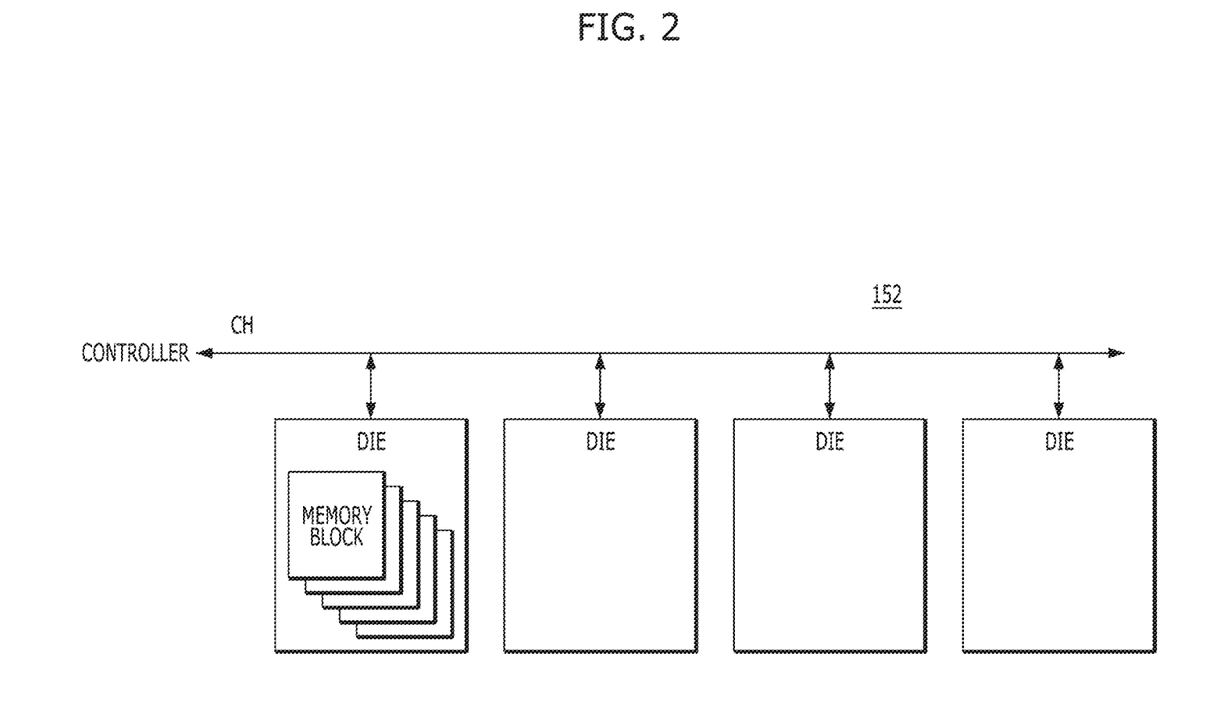
FIG. 2 illustrates an example of the first memory device 152 of the plurality of memory devices 152 and 154 included in the memory system 110 of FIG. 1.

FIG. 2 illustrates an example of the first memory device 152 of the plurality of memory devices 152 and 154 included in the memory system 110 of FIG. 1.

The first memory device 152 may include a plurality of memory dies DIE. For example, each of the plurality of memory dies DIE may be a NAND memory die. The plurality of memory dies DIE may be coupled to the controller 130 through a channel CH.

Each of the memory dies DIE may include a plurality of memory blocks each including a plurality of pages. In some implementations, multiple blocks can constitute a plane. One memory die DIE may receive one command at a time. In some implementations, one memory die DIE may include a plurality of planes. The plurality of planes may process in parallel commands received by the memory die DIE. Each of the planes may include a plurality of memory blocks, which is the minimum unit of an erase operation. One memory block may include a plurality of pages, which is the minimum unit of a write or read operation. The plurality of memory dies DIE may operate in parallel.

Furthermore, the structure of the second memory device 154 may be substantially the same as or similar to the structure of the first memory device 152. The plurality of memory devices 152 and 154 may operate in parallel.

Figure 3:
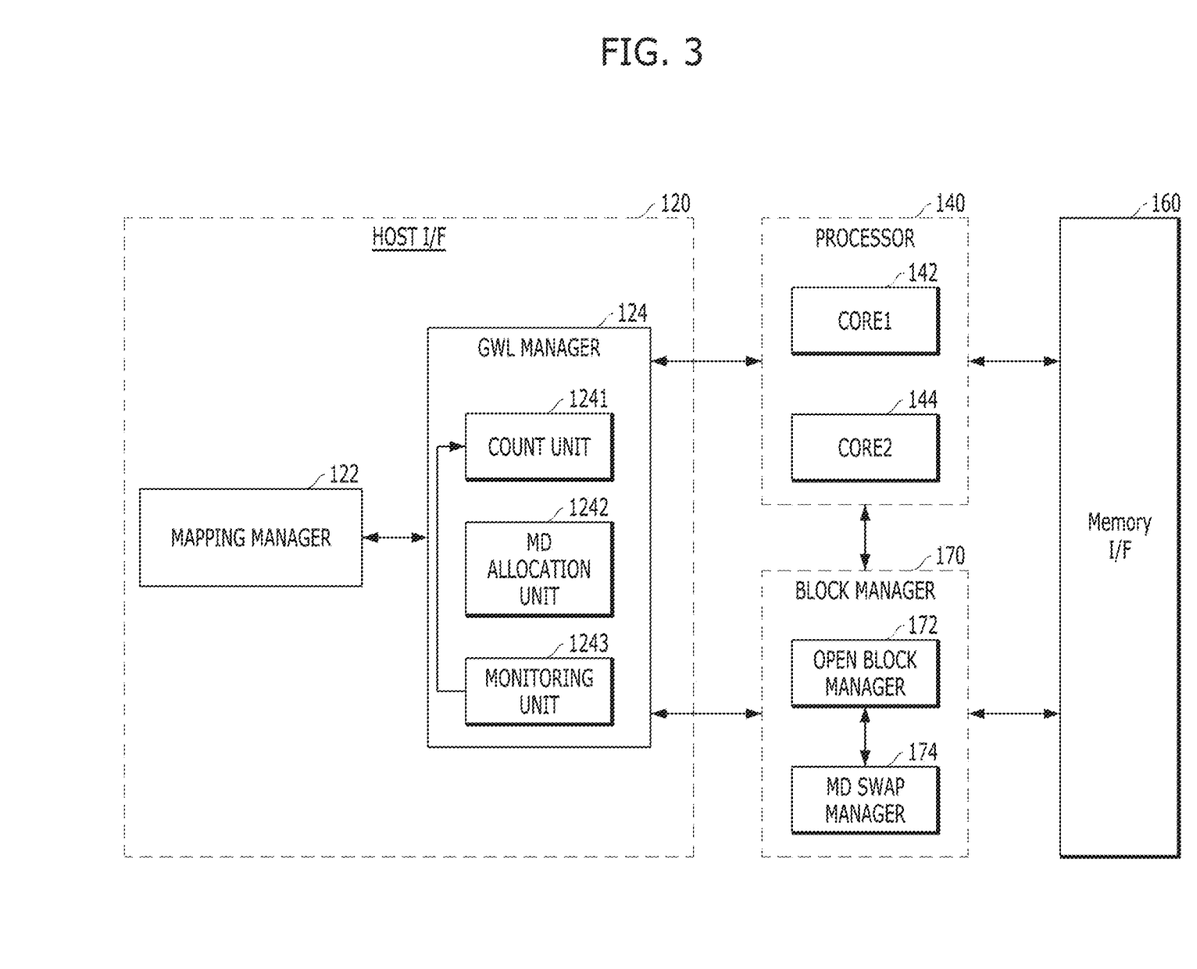
FIG. 3 illustrates an example of a controller based on an embodiment of the disclosed technology.
Figure 4:
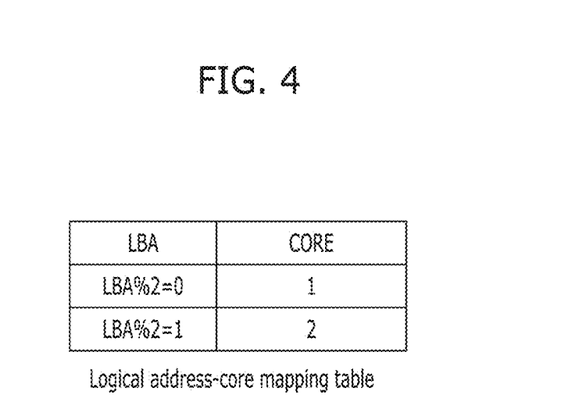
FIG. 4 is a diagram illustrating an example of a logical address-core mapping table based on an embodiment of the disclosed technology.
Figure 5:
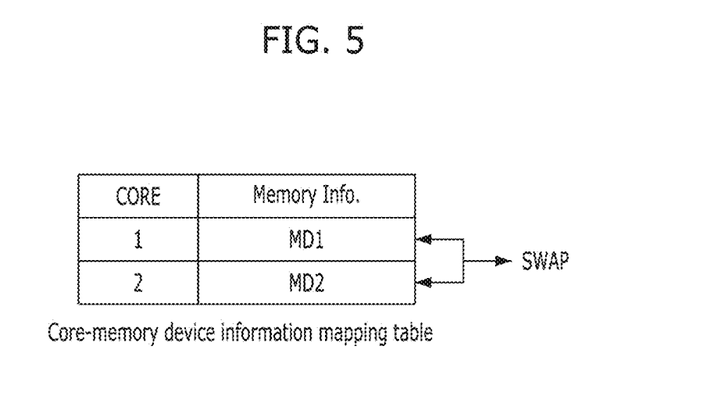
FIG. 5 is a diagram illustrating a core-memory device information mapping table based on an embodiment of the disclosed technology.

FIG. 3 illustrates an example of a controller based on an embodiment of the disclosed technology.

In some implementations, the host I/F 120 may include a mapping manager 122 and a global wear-leveling (GWL) manager 124.

The mapping manager 122 may sequentially store a command, data, and a request including a logical address, transmitted by the host 102, in a buffer (not illustrated), and may distribute the logical address for the operations requested among the plurality of cores based on a sequence of queued access requests.

Specifically, the mapping manager 122 may perform a modulo operation on the logical address as requested by the host 102, based on the number of cores, and may distribute the request among the cores based on a result of the modulo operation. That is, if the number of the plurality of cores is n, the mapping manager 122 may select any one of the plurality of cores based on a result of an "LBA % n" operation. In this case, the "LBA % n" operation indicates a remainder obtained by dividing "LBA" by n (n is the number of cores). For example, according to a logical address-core mapping table of FIG. 4, when a result value of a modulo operation on a logical address included in a request is "0," the mapping manager 122 may distribute the request to the first core 142. Furthermore, when a result value of a modulo operation on a logical address included in a request is "1," the mapping manager 122 may distribute the request to the second core 144. In one example, the modulo operation is used to distribute the request from the host 102 among the cores, and in another example, the request may be distributed among the cores by applying another operation other than the modulo operation, such as an operation including calculations to map one logical address to one core.

Furthermore, the mapping manager 122 may translate a logical address, included in a request from the host 102, into an internal logical address. For example, if the logical address received from the host is "LBA0," the logical address may be distributed to the first core 142. An internal logical address to be translated into an actual physical address of a memory device in the first core 142 may be translated into "CLBA0." When the logical address received from the host is "LBA1," the logical address may be distributed to the second core 144. An internal logical address to be translated into an actual physical address of a memory device in the second core 144 may be translated into "CLBA0." Furthermore, if the logical address received from the host is "LBA2," the logical address may be distributed to the first core 142. An internal logical address to be translated into an actual physical address of a memory device in the first core 142 may be translated into "CLBA1."

Furthermore, the mapping manager 122 may transmit, to the GWL manager 124, a request including a translated internal logical address CLBA and distributed core information.

The GWL manager 124 may include a counting unit 1241, a memory device information (MD) allocation unit 1242 and a monitoring unit 1243.

If a request received from the mapping manager 122 is a write request, the counting unit 1241 may increase the write count of a core of an internal logical address based on mapping between the internal logical address and the core. In this case, the reason why the write count of each of the plurality of cores 152 and 154 is managed is for determining whether to periodically perform global wear-leveling through the monitoring unit 1243.

If a request received from the mapping manager 122 is a write request, the MD allocation unit 1242 may check a logical address, included in the request, according to a core-memory device information mapping table indicating mapping between an internal logical address and a core, may distribute corresponding memory device information, and may transmit the request to the corresponding core. The core-memory device information mapping table includes information on a plurality of cores and memory device information mapped to correspond to each of the plurality of cores. The core-memory device information mapping table may be stored in the memory. For example, according to the core-memory device information mapping table of FIG. 5, information on the first core 142 and the second core 144 may be stored in the core-memory device information mapping table. First memory device information MD1 corresponds to the first core 142 so that the first core 142 can access the first memory device based on a request. Second memory device information MD2 corresponds to the second core 144 so that the second core 144 can access the second memory device based on a request. That is, if a core that will process "LBA0" is the first core 142, the MD allocation unit 1242 may transmit the first memory device information MD1 to the first core 142 by assigning the first memory device information MD1 to "LBA0."

The monitoring unit 1243 may monitor a wear level of each of the plurality of memory devices 152 and 154 based on a write count corresponding to each of the plurality of cores 142 and 144. That is, the monitoring unit 1243 may determine a trend of the increase in the wear level of a memory device. For example, the monitoring unit 1243 may determine that the wear level of a memory device is deteriorating fast based on its recent write count of the memory device compared to its prior write count. As more write requests from the host 102 are received by a core, more write operations may be performed on a memory device controlled by the core. In that regard, the monitoring unit 1243 may determine that such a core recently has received more requests than before from the host 102. Accordingly, the monitoring unit 1243 may determine a wear-level of a memory device, corresponding to each of the plurality of cores, and the trend of the changes in the wear level based on a write count corresponding to each of the plurality of cores 142 and 144. A global wear-leveling operation may be triggered based on a result of the determination. Accordingly, in order to determine whether to perform a global wear-leveling operation, the monitoring unit 1243 may periodically check whether a write count of each of the plurality of cores has reached a write threshold value TH based on a timer (not illustrated). In an embodiment, the monitoring unit 1243 periodically checks as to whether a write count has reached the write threshold value. In another embodiment, the monitoring unit 1243 may check a write count whenever an operations requested by the host is completed, or in another embodiment, the monitoring unit 1243 may check a write count when a memory device is disabled. When a count value of each of the plurality of cores 142 and 144 is greater than or equal to the write threshold value TH, the monitoring unit 1243 may perform a global wear-leveling operation. For example, assuming that the write threshold value TH is "30," by monitoring write counts of the first core 142 and the second core 144 periodically stored in the memory 131, when the write count of the first core 142 is "40" and the write count of the second core 144 is "25," the monitoring unit 1243 may determine that the first core 142 has a heavier write load than the second core 144 because the write count "40" of the first core 142 is greater than or equal to the write threshold value TH, and thus may determine to perform a global wear-leveling operation between the plurality of cores.

If the execution of the global wear-leveling operation is determined as described above, the monitoring unit 1243 may perform the global wear-leveling operation through a first global wear-leveling step, a second global wear-leveling step, and a third global wear-leveling step.

First, in the first global wear-leveling step, the monitoring unit 1243 may perform a barrier operation for a request from the host. That is, to perform the barrier operation for the request from the host may mean that up to only a request being processed is completed after the request from the host is suspended.

Next, in order to perform the second global wear-leveling step, the monitoring unit 1243 may perform a barrier operation for the request from the host, and may then transmit a request for an update of mapping information for mapping the plurality of cores to the plurality of memory devices to a memory device information (MD) swap manager 174 of the block manager 170.

Finally, in the third global wear-leveling step, when an update of the mapping information for mapping the plurality of cores to the plurality of memory devices is completed through the block manager 170, the monitoring unit 1243 transmits, to the plurality of cores 142 and 144, the changed mapping information between the plurality of cores and the plurality of memory devices and a request to close an open block being used.

The block manager 170 may include an open block manager 172 and the MD swap manager 174.

Upon receiving, from the plurality of cores 142 and 144, an open block information request for a memory device controlled for each core, the open block manager 172 may check memory device information included in the open block information request received from the plurality of cores, and may assign, to a corresponding core, information on any one of one or more open blocks included in an open block list corresponding to the memory device information.

Upon receiving a request for an update of the mapping information for mapping the plurality of cores to the plurality of memory devices, from the monitoring unit 1243, the MD swap manager 174 may update mapping information between the plurality of cores and the plurality of memory devices, included in the core-memory device information mapping table, based on the write count of each of the cores by swapping the mapping information between different cores and/or between different memory devices. In one example, the MD swap manager 174 may swap memory device information corresponding to a core having the highest write count with different memory device information corresponding to another core having the lowest write count. For example, referring to the core-memory device information mapping table of FIG. 5, the MD swap manager 174 may update mapping information by swapping information on the first memory device 152 for information on the second memory device 154, which correspond to the plurality of cores 142 and 144 included in the core-memory device information mapping table, respectively. As mapping information is updated by swapping information on the first memory device 152 for information on the second memory device 154 corresponding to the plurality of cores 142 and 144, respectively, as described above, the second memory device 154 may be controlled by the first core 142, and the first memory device 152 may be controlled by the second core 142. Accordingly, an operation corresponding to a write request including a logical address distributed to the first core 142 may be performed by the second memory device 154, and an operation corresponding to a write request including a logical address distributed to the second core 144 may be performed by the first memory device 152. Accordingly, by swapping memory device information corresponding to the cores 142 and 144, respectively, as described above, an effective global wear-leveling operation can be performed even without moving data stored in the plurality of memory devices 152 and 154.

Figure 6:
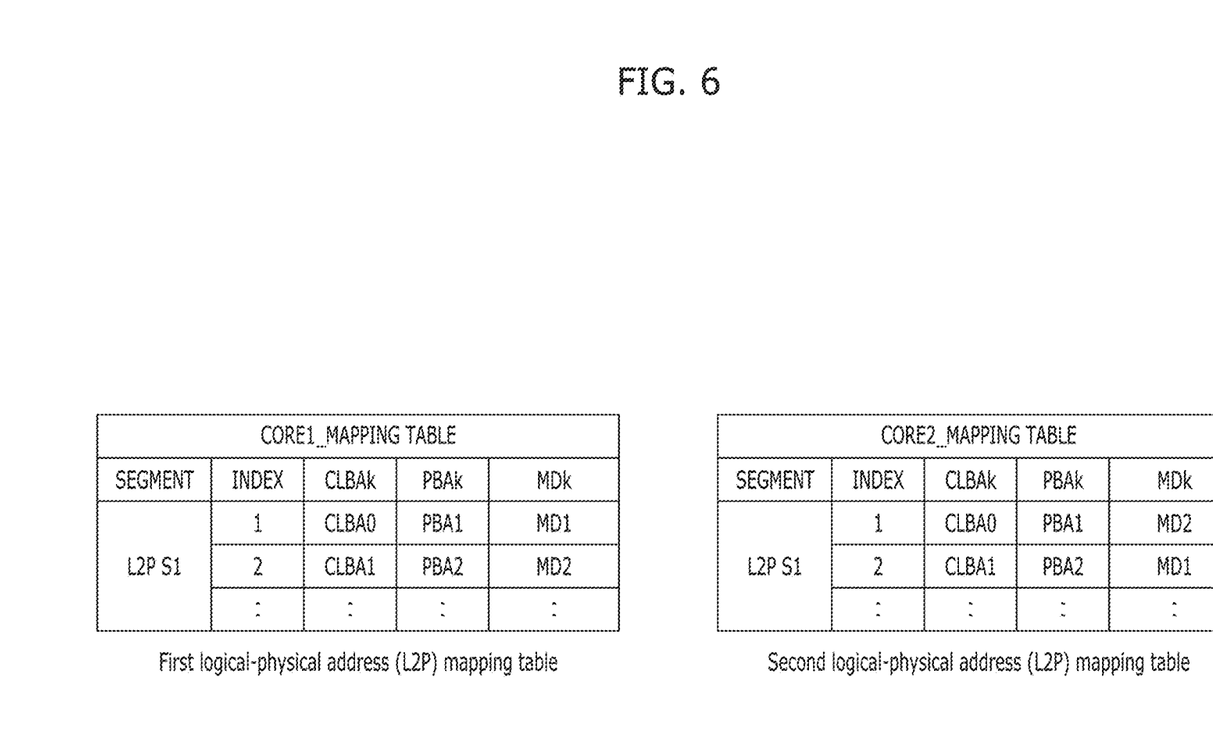
FIG. 6 is a diagram illustrating first and second L2P mapping tables based on an embodiment of the disclosed technology.

Next, the plurality of cores 142 and 144 included in the processor 140 may receive, from the host I/F 120, a request including an internal logical address and memory device information, and may process the request. Specifically, if the received request is a write request, the plurality of cores 142 and 144 may check whether an open block is present, in order to translate the internal logical address into an actual physical address of a memory device corresponding to the memory device information. If, as a result of the check, an open block is not present, the plurality of cores 142 and 144 may receive open block information by requesting, from the open block manager 172, the open block information corresponding to the memory device information. The plurality of cores 142 and 144 may translate the internal logical address into the actual physical address based on the open block information, may store the translated physical address in a logical-physical address (L2P) mapping table corresponding to a corresponding core, and may transmit the request, the memory device information and the physical address to the memory I/F 160. In this case, the plurality of cores 142 and 144 does not request the open block information from the open block manager 172 whenever it receives a write request. If a space in which data can be written is not present in an open block being used, the plurality of cores 142 and 144 may receive open block information by requesting the open block manager 172 to assign the open block information. The plurality of cores 142 and 144 may translate the internal logical address into the physical address based on the open block information. For example, first and second L2P mapping tables of FIG. 6 are described below. The first L2P mapping table is managed by the first core 142, and the second L2P mapping table is managed by the second core 144. Each of the first and second L2P mapping tables may include a plurality of L2P segments L2P S1 to L2P Sj. The plurality of L2P segments L2P S1 to L2P Sj may be generated by grouping all of logical addresses received from the host 102 by a preset number. Each of the L2P segments L2P S1 to L2P Sj may include an internal logical address (CORE-LBA), a physical address (PBA) corresponding to the internal logical address, and memory device information (Memory Info.) for a memory device in which data will be stored based on the physical address, based on an N-th index. In this case, the memory device information (Memory Info.) indicates information on a memory device assigned to each of the cores through the MD allocation unit 1242 of the host I/F 120. Specifically, in the first and second L2P mapping tables of FIG. 6, only a first segment S1 is described as an example. In the first L2P mapping table, "CLBA0," "PBA1," and "MD1" are stored as an internal logical address (CORE-LBA), a physical address, and memory device information, respectively, based on a first index. Furthermore, "CLBA1," "PBA2" and "MD2" are stored as an internal logical address (CORE-LBA), a physical address, and memory device information, respectively, based on a second index.

In the second L2P mapping table, "CLBA0", "PBA1", and "MD2" are stored as an internal logical address (CORE-LBA), a physical address, and memory device information, respectively, based on a first index. Furthermore, "CLBA1,"

"PBA2" and "MD1" are stored as an internal logical address (CORE-LBA), a physical address, and memory device information, respectively, based on a second index.

In this case, it can be seen that in the first and second L2P mapping tables, the memory device information of the first indices and the memory device information of the second indices are different. That is, "MD1," that is, the memory device information of the first index, is information written before global wear-leveling is performed. "MD2," that is, the memory device information of the second index, is information assigned based on a logical address included in a request from the host after mapping information between the plurality of cores and the plurality of memory devices is updated due to the global wear-leveling operation.

Furthermore, when receiving a read request, the plurality of cores 142 and 144 may receive the read request from the host I/F 120 and process the read request based on a logical address. That is, the plurality of cores 142 and 144 may check memory device information and a physical address, corresponding to an internal logical address included in the received read request, in an L2P mapping table corresponding to each of the cores. If, as a result of the check, the memory device information and physical address corresponding to the internal logical address included in the received read request are present in the L2P mapping table (MAP HIT), the multi-core may transmit the request, the memory device information, and the physical address to the memory I/F 160 in order to read data from a page within a block of the corresponding memory device based on the checked memory device information and physical address. In contrast, if, as a result of the check, the memory device information and physical address corresponding to the internal logical address included in the received read request are not present in the L2P mapping table (MAP MISS), the multi-core may check location information for an L2P segment, including the logical address included in the request, in an L1 mapping table (not illustrated). In this case, the L1 mapping table may store location information for each of the L2P segments L2P S1 to L2P Sj included in the L2P mapping table, that is, a physical address PBA, and memory device information. The multi-core may load the stored L2P segment from the corresponding memory device to the memory 131 through the memory I/F 160 based on the location information of the L2P segment checked in the L1 mapping table (not illustrated). Furthermore, the multi-core may check the memory device information and physical address corresponding to the internal logical address with reference to the L2P segment, and may perform a read operation through the memory I/F 160.

The plurality of cores 142 and 144 may receive, from the host I/F 120, mapping information between the plurality of cores and the plurality of memory devices and a request to close an open block being used, and may perform the third global wear-leveling operation step. After closing the open block being used, the plurality of cores 142 and 144 may transmit, from the open block manager 172 an open block information reassignment request including the updated memory device information, and may be reassigned open block information corresponding to the updated memory device information in response to the open block information reassignment request.

The memory I/F 160 may process a request for a memory device based on a request, memory device information, and a physical address received from each of the plurality of cores 142 and 144. That is, when receiving a write request, memory device information, and a physical address from each of the plurality of cores 142 and 144, the memory I/F 160 may check the memory device based on the memory device information and write data in the physical address. Furthermore, when receiving a read request, memory device information, and a physical address from each of the plurality of cores 142 and 144, the memory I/F 160 may check the memory device based on the memory device information and then read data from the physical address.

Figure 7:
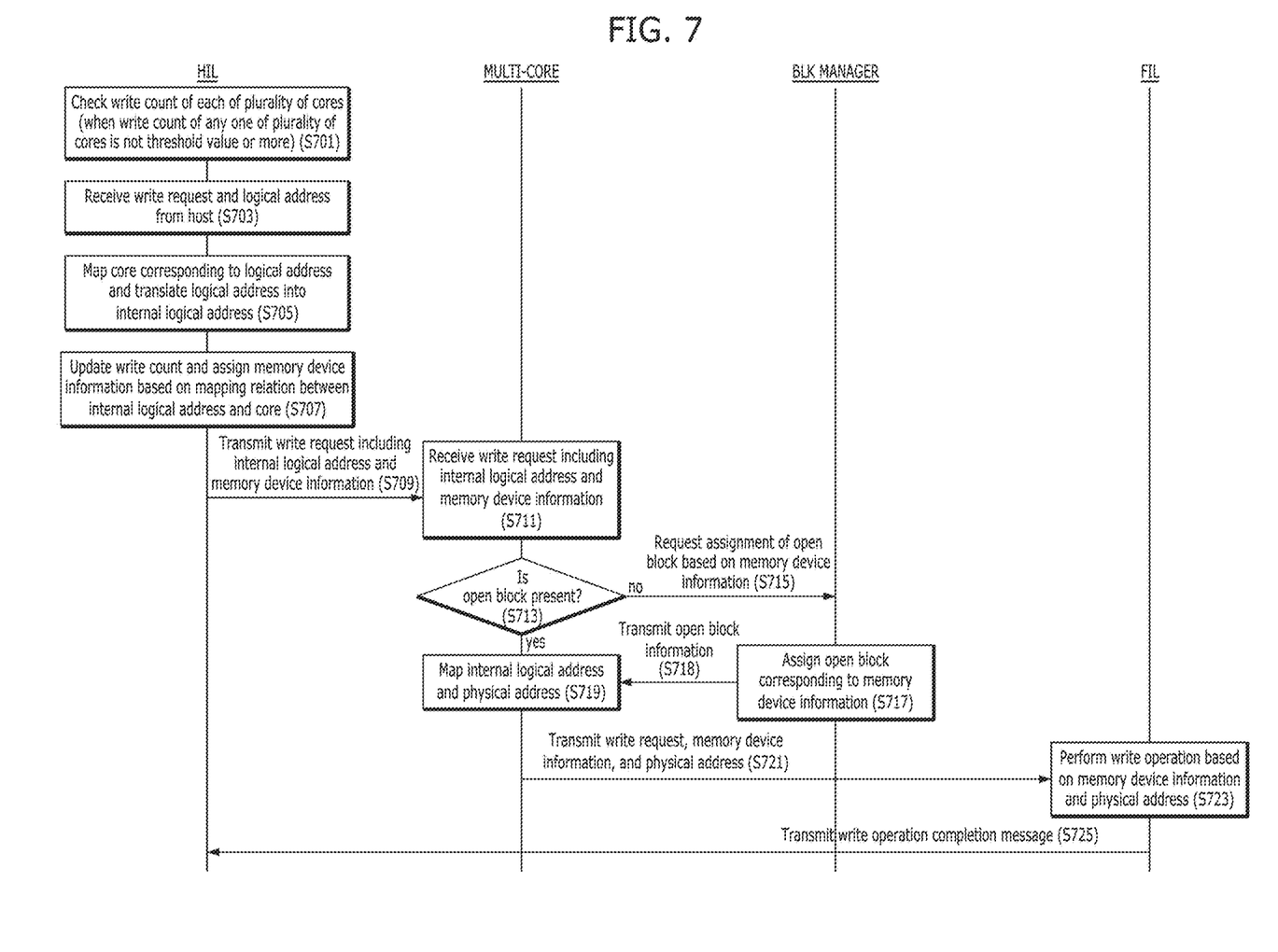
FIG. 7 is a flowchart of an example of a write operation method based on an embodiment of the disclosed technology.

FIG. 7 is a flowchart of an example of a write operation method based on an embodiment of the disclosed technology.

Referring to FIG. 7, at step S701, in order to determine whether to perform a global wear-leveling operation, the host I/F 120 may periodically check whether a count value of each of the plurality of cores is greater than or equal to a threshold value, based on the invoking of a timer (not illustrated). When the count value of each of the plurality of cores 142 and 144 is less than the threshold value, the host I/F 120 may receive a write request and a logical address from the host 102 (S703). In contrast, when the count value of each of the plurality of cores 142 and 144 is greater than or equal to the threshold value, the host I/F 120 may determine to perform the global wear-leveling operation. This is described with reference to FIG. 8.

At step S705, after distributing, to any one of the plurality of cores, the logical address included in the write request received from the host 102, the host I/F 120 may translate the logical address into an internal logical address, and may manage a mapping relation between the internal logical address and the corresponding core.

At step S707, the host I/F 120 may assign memory device information based on an increase in the write count of the corresponding core and the mapping relation between the internal logical address and the core, based on the mapping between the internal logical address and the corresponding core.

At step S709, the host I/F 120 may transmit the write request, including the internal logical address, and the memory device information to the corresponding core based on the mapping between the internal logical address and the corresponding core.

At step S711 and step S713, any one of the plurality of cores 142 and 144 may receive, from the host I/F 120, the request including the internal logical address and the memory device information, and may process the request. The corresponding core may check whether an open block is present, in order to translate the internal logical address, included in the received write request, into an actual physical address of a memory device corresponding to the memory device information.

If, as a result of the check, an open block is not present, the corresponding core may request, from the block manager 170, open block information corresponding to the memory device information (S715).

At step S717 and step S718, the block manager 170 may transmit, to the corresponding core, the open block information by assigning the open block information corresponding to the memory device information to the corresponding core (S717).

At step S719, the processor 140 may receive the open block information as a response to the request, based on the received open block information. The processor 140 may translate the internal logical address into a physical address based on the received open block information and store the physical address in a corresponding L2P mapping table.

At step S721, the processor 140 may transmit the write request, the memory device information, and the physical address to the memory I/F 160.

At step S723 and step S725, the memory I/F 160 may perform a write operation on the physical address of a corresponding memory device based on the received write request, memory device information, and physical address.

Figure 8:
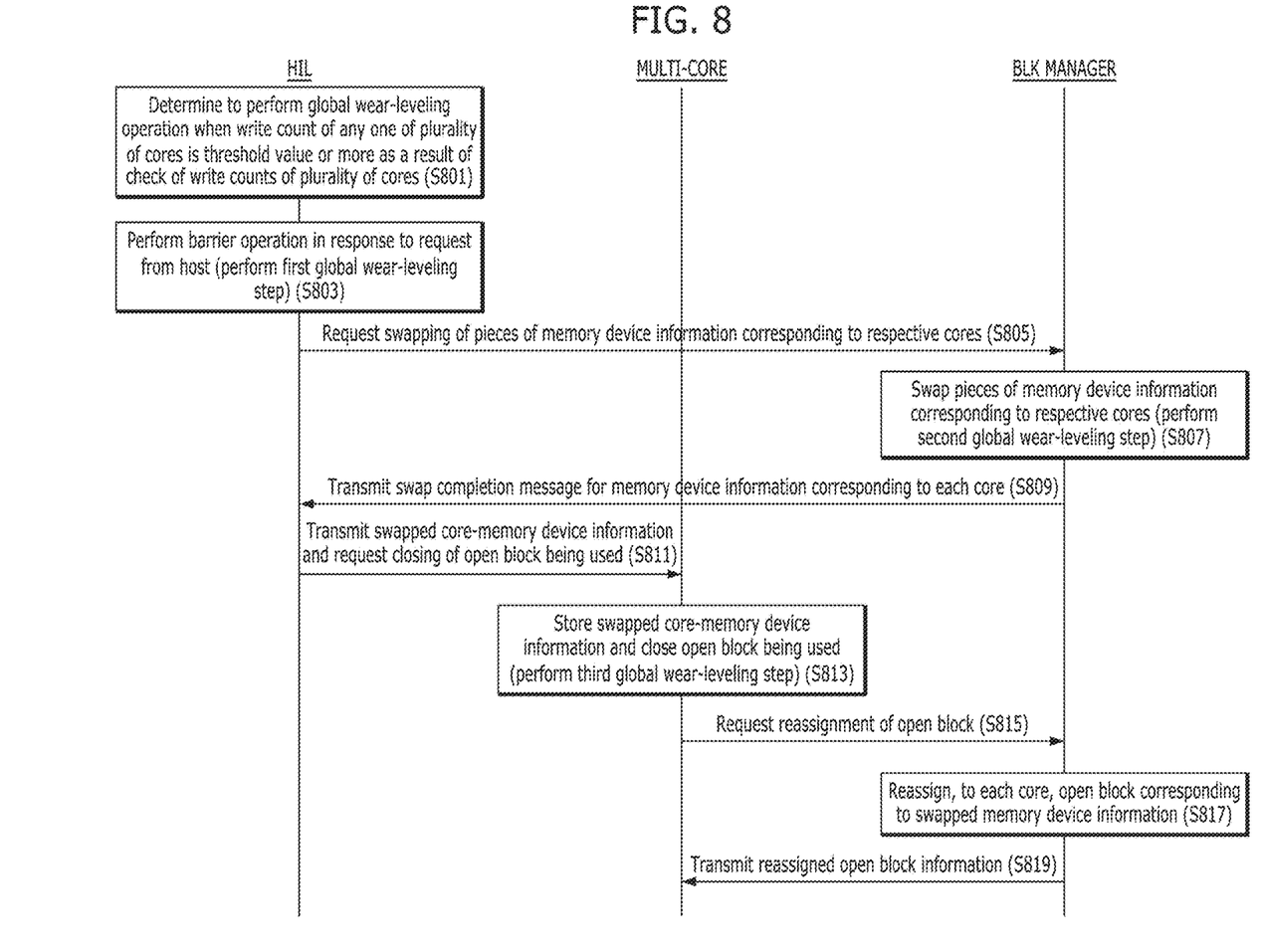
FIG. 8 is a flowchart of an example of a global wear-leveling operation based on an embodiment of the disclosed technology.

FIG. 8 is a flowchart of an example of a global wear-leveling operation based on an embodiment of the disclosed technology.

Referring to FIG. 8, at step S801, in order to determine whether to perform a global wear-leveling operation, the host I/F 120 may periodically check whether a write count of each of the plurality of cores is greater than or equal to a threshold value, based on the invoking of a timer (not illustrated). When the write count of each of the plurality of cores 142 and 144 is greater than or equal to the threshold value, the host I/F 120 may determine to perform the global wear-leveling operation. If the execution of the global wear-leveling operation is determined, the host I/F 120 may perform the global wear-leveling operation through a first global wear-leveling step, a second global wear-leveling step, and a third global wear-leveling step.

At step S803, the host I/F 120 may perform a barrier operation for a request from the host (the first global wear-leveling step). That is, to perform the barrier operation for the request from the host may mean that the generation of a command based on the request from the host is delayed and the request from the host is suspended.

At step S805, after performing the barrier operation for the request from the host, the host I/F 120 may transmit a mapping swap request between the plurality of cores and the plurality of memory devices to the block manager 170.

At step S807 and step S809, when receiving the mapping swap request between the plurality of cores and the plurality of memory devices from the host I/F 120, the block manager 170 may update mapping information (hereinafter referred to as a "core-memory device mapping information") between the plurality of cores and the plurality of memory devices, included in the core-memory device information mapping table, based on a write count of each of the cores. That is, the MD swap manager 174 may change the mapping information by swapping memory device information corresponding to a core having the highest write count, among the plurality of cores, for memory device information corresponding to a core having the lowest write count, among the plurality of cores.

Furthermore, the block manager 170 may transmit, to the host I/F 120, a memory device information swap completion message corresponding to each of the cores.

At step S811, the block manager 170 may request the mapping information between the plurality of cores and the plurality of memory devices and the closing of an open block being used.

At step S813 and step S815, when receiving, from the host I/F 120, the mapping information between the plurality of cores and the plurality of memory devices and the request to close the open block being used, the plurality of cores 142 and 144 may close the open block being used (the third global wear-leveling operation step), and may transmit, to the block manager 170, an open block information reassignment request including updated memory device information.

At step S817 and step S819, when receiving, from the multi-core, the open block information reassignment request including the updated memory device information, the block manager 170 may reassign open block information corresponding to the updated memory device information based on the updated core-memory device information mapping table, and may transmit the reassigned open block information to each of the cores.

Figure 9:
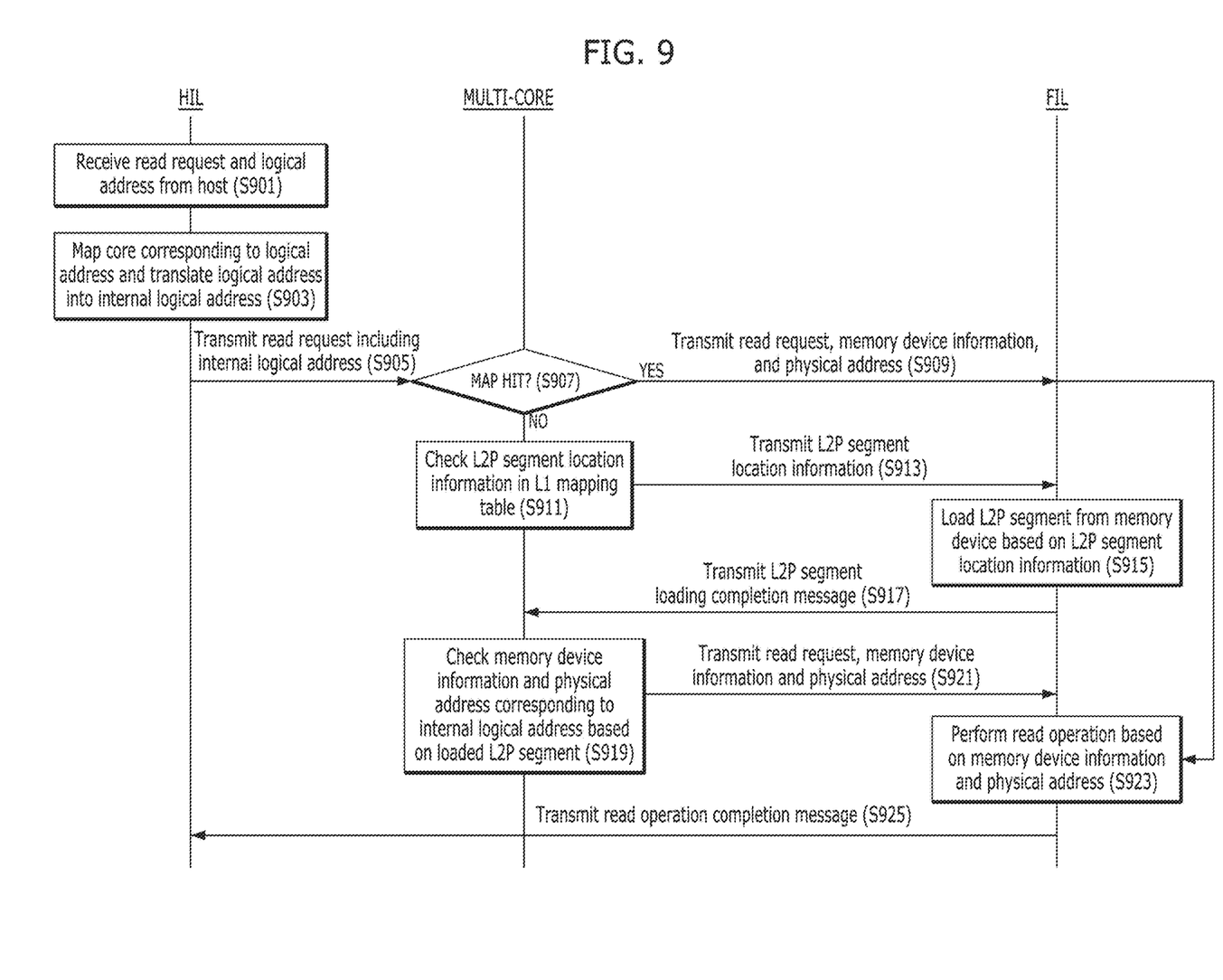
FIG. 9 is a flowchart of an example of a read operation based on an embodiment of the disclosed technology.

FIG. 9 is a flowchart of an example of a read operation based on an embodiment of the disclosed technology.

Referring to FIG. 9, at step S901 and step S903, after distributing, to any one of the plurality of cores, a logical address included in a read request received from the host 102, the host I/F 120 may translate the logical address into an internal logical address, and may manage a mapping relation between the internal logical address and the corresponding core.

At step S905, the host I/F 120 may transmit, to the corresponding core, the read request including the internal logical address based on the mapping between the internal logical address and the corresponding core.

At step S907, when receiving the read request including the internal logical address, any one of the plurality of cores 142 and 144 may check whether memory device information and a physical address corresponding to the internal logical address included in the read request are present in an L2P mapping table stored in the memory and corresponding to the corresponding core.

If, as a result of the check, the memory device information and physical address corresponding to the internal logical address included in the read request are present in the L2P mapping table (MAP HIT) (YES), the corresponding core may transmit the read request, the memory device information, and the physical address to the memory I/F 160 in order to read data from a page within a block of a corresponding memory device based on the checked memory device information and physical address (S909).

In contrast, if, as a result of the check, the memory device information and physical address corresponding to the internal logical address included in the read request are not present in an L2P mapping table (MAP MISS) (NO), the corresponding core may check location information for an L2P segment, including the logical address included in the read request, in the L1 mapping table (not illustrated) stored in the memory 131 (S911). The L1 mapping table may store location information for each of the L2P segments L2P S1 to L2P Sj included in the L2P mapping table, that is, a physical address (PBA), and memory device information.

At step S913, the corresponding core may transmit, to the memory I/F 160, the location information of the L2P segment checked in the L1 mapping table (not illustrated).

At step S915 and step S917, the memory I/F 160 may load the L2P segment from a corresponding memory device to the memory 131 based on the received location information of the L2P segment, and may then transmit a loading completion message to the corresponding core.

At step S919 and step S921, any one of the plurality of cores may check the memory device information and physical address, corresponding to the internal logical address of the read request, based on the loaded map segment, and may transmit the checked memory device information and physical address to the memory I/F 160.

At step S923 and step S925, the memory I/F 160 may perform a read operation based on the memory device information and the physical address, and may then transmit a read operation completion message to the host I/F 120.

Based on the embodiments, a global wear-leveling operation between a plurality of cores can be performed based on a write count corresponding to each of the plurality of cores. Upon execution of global wear-leveling, a wear-leveling degree between memory devices can be effectively equalized by swapping only memory device information corresponding to a plurality of cores, respectively, without moving data stored in the plurality of memory devices.

Effects which may be obtained by the embodiments are not limited to the aforementioned effects, and other technical effects not described above may be evidently understood by a person having ordinary skill in the art, to which the present disclosure pertains, from the above description.

Although various embodiments have been described for illustrative purposes, it will be apparent to those skilled in the art that various changes and modifications may be made based on the disclosure of this patent document.

What is claimed is:

1. A memory system comprising:
   a plurality of memory devices; and
   a controller comprising a plurality of cores coupled to be in communications with, and structured to be operable to control, the plurality of memory devices, wherein each core is operable to control one or more of the plurality of memory devices,
   wherein the controller comprises:
   a host interface to provide, in response to a request from a host, to one or more of the plurality of cores, memory device information corresponding to the one or more of the plurality of memory devices assigned to the one or more of the plurality of cores based on first mapping information for mapping logical addresses to the one or more of the plurality of cores and second mapping information for mapping the one or more of the plurality of cores to the memory device information, and determine whether to perform a global wear-leveling operation based on a write count of the one or more of the plurality of memory devices; and
   a block manager to update the second mapping information by swapping the second mapping information between different cores based on the global wear-leveling operation and transmit open block information of the memory device to each of the plurality of cores by assigning the open block information based on memory device information assigned to each of the plurality of cores.

2. The memory system of claim 1, wherein the plurality of cores is further configured to:
   upon receiving the request and the memory device information from the host interface, receive, from the block manager, the assigned open block information by requesting the open block information corresponding to the memory device information;
   processing the request by translating a logical address into a physical address; and
   storing, in a logical-physical mapping table, memory device information and a physical address corresponding to the logical address.

3. The memory system of claim 1, wherein the host interface is configured to:
   periodically monitor whether a write count of the one or more of the plurality of memory devices corresponding to each of the plurality of cores is greater than or equal to a write threshold value, to determine a wear-level of each of the plurality of memory devices;
   determine to perform the global wear-leveling operation when the write count of any one core among the count values of the plurality of cores is greater than or equal to the write threshold value;
   perform a barrier operation for the request from the host upon determination to perform the global wear-leveling operation; and
   transmit, to the block manager, a request for the swapping of the second mapping information.

4. The memory system of claim 3, wherein upon receiving the request for the swapping of the second mapping information from the host interface, the block manager updates the second mapping information by swapping the second mapping information based on the write count of the one or more of the plurality of memory devices corresponding to each of the plurality of cores.

5. The memory system of claim 4, wherein the block manager updates the second mapping information by swapping memory device information corresponding to a core having a highest write count, among the plurality of cores, for memory device information corresponding to another core having a lowest write count, among the plurality of cores.

6. The memory system of claim 1, wherein the host interface transmits, to each of the plurality of cores, the memory device information updated by the block manager, based on the updated second mapping information.

7. The memory system of claim 6, wherein each of the plurality of cores is configured to:
   close an open block in use upon receiving the updated memory device information from the host interface; and
   receive new open block information reassigned by the block manager and corresponding to the updated memory device information.

8. The memory system of claim 1, wherein, upon receiving a read request through the host interface, any one of the plurality of cores is configured to:
   check, in a logical-physical mapping table of the core, memory device information and a physical address corresponding to a logical address included in the read request; and
   process the read request by transmitting the read request, the memory device information, and the physical address to a memory interface.

9. The memory system of claim 8, wherein, when the memory device information and physical address corresponding to the logical address included in the read request are present in the logical-physical mapping table corresponding to each of the plurality of cores, the plurality of cores is configured to process the read request by transmitting the read request, the memory device information, and the physical address to the memory interface.

10. The memory system of claim 8, wherein, when the memory device information and physical address corresponding to the logical address included in the read request are not present in the logical-physical mapping table corresponding to each of the plurality of cores, the plurality of cores is configured to:
    check, in an L1 mapping table, location information of a map segment comprising the logical address included in the read request;
    load the map segment from any one of the plurality of memory devices to the logical-physical mapping table through the memory I/F;
    check, based on the loaded map segment, the memory device information and physical address corresponding to the logical address included in the read request; and
    perform the read request through the memory interface.

11. The memory system of claim 1, further comprising a memory interface configured to:
    receive a request, a physical address and memory device information from the plurality of cores;
    select a memory device based on the received memory device information; and
    process the request for the physical address.

12. A method of operating a memory system that includes a plurality of memory devices and a controller including a plurality of cores controlling the plurality of memory devices, the method comprising:
- determining whether to perform a global wear-leveling operation based on a write count of the plurality of memory devices corresponding to each of the plurality of cores;
- performing a barrier operation for a request from a host when the global wear-leveling operation is determined to be performed;
- updating mapping information for mapping a core to memory device information by swapping the mapping information between different cores based on the write count of each of the plurality of cores; and
- closing an open block assigned to each of the plurality of cores and then assigning a new open block to each of the plurality of cores based on the updated mapping information.

13. The operating method of claim 12, wherein the determining of whether to perform the global wear-leveling operation comprises:
- periodically monitoring whether the write count corresponding to each of the plurality of cores is greater than or equal to a write threshold value to determine a wear-level of each of the plurality of memory devices, and
- determining to perform the global wear-leveling operation when the write count of the plurality of memory devices corresponding to any one core is greater than or equal to the write threshold value.

14. The operating method of claim 12, wherein the updating of the mapping information comprises:
- updating the mapping information by swapping memory device information corresponding to a core having a highest write count, among the plurality of cores, for memory device information corresponding to a core having a lowest write count, among the plurality of cores.

15. The operating method of claim 13, further comprising providing the memory device information to any one of the plurality of cores by assigning the memory device information based on mapping information for mapping a logical address to a core and the mapping information for mapping the core to the memory device information in response to the request from the host, when the write count of any one core among the write counts of the plurality of cores is less than the write threshold value.

16. The operating method of claim 15, wherein the providing of the memory device information to any one of the plurality of cores by assigning the memory device information based on the mapping information for mapping the logical address to the core and the mapping information for mapping the core to the memory device information in response to the request from the host comprises:
- performing a modulo operation on the logical address included in the request based on the number of the plurality of cores, checking the mapping information between the logical address and the core based on a result of the modulo operation, and distributing a core corresponding to the request; and
- after distributing the core corresponding to the request, checking memory device information, corresponding to the distributed core, based on the mapping information between the core and the memory device information and assigning the memory device information to the request.

17. The operating method of claim 15, further comprising:
- upon receiving a write request and memory device information, to translate a logical address, included in the write request, into a physical address of a memory device corresponding to the assigned memory device information, checking, by any one of the plurality of cores, whether an open block is present;
- receiving an open block assigned based on the memory device information when the open block is not present; and
- processing the write request.

18. The operating method of claim 14, further comprising:
- upon receiving a read request and memory device information, checking, by any one of the plurality of cores, whether memory device information and a physical address corresponding to a logical address included in the read request are present in a logical-physical mapping table corresponding to the core.

19. The operating method of claim 18, further comprising processing the read request based on the memory device information and the physical address, when the memory device information and physical address corresponding to the logical address included in the read request are present in the logical-physical mapping table corresponding to the core as a result of the check.

20. The operating method of claim 18, further comprising:
- when the memory device information and physical address corresponding to the logical address included in the read request are not present in the logical-physical mapping table corresponding to the core as a result of the check, checking, in an L1 mapping table, location information of a map segment where the logical address included in the read request is stored;
- loading, from a corresponding memory device, memory device information and a physical address corresponding to the logical address included in the read request, based on the location information of the map segment; and
- processing the read request based on the loaded memory device information and physical address.

* * * * *